Oct. 8, 1968     R. A. BERGAN     3,405,275
HIGH VOLTAGE INSULATOR FOR NEUTRON GENERATOR
Filed Jan. 4, 1965
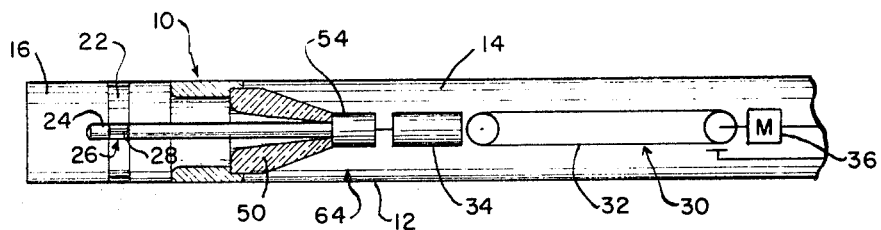
FIG. 1
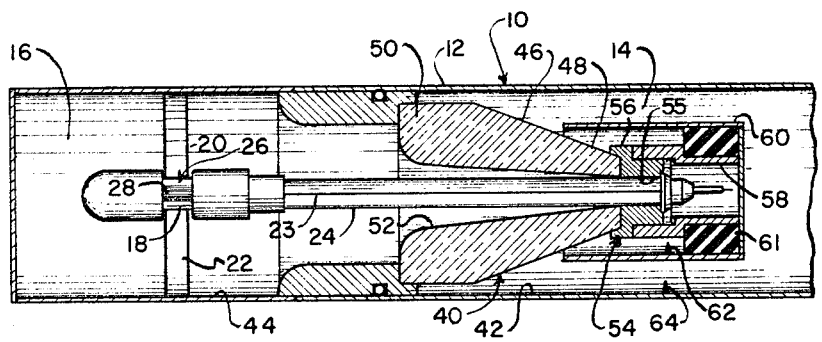
FIG. 2
INVENTOR.
REUBEN A. BERGAN
BY
ATTORNEY United States Patent Office 3,405,275
Patented Oct. 8, 1968

3,405,275
HIGH VOLTAGE INSULATOR FOR
NEUTRON GENERATOR
Reuben A. Bergan, Houston, Tex., assignor to Dresser
Industries, Inc., Dallas, Tex., a corporation of Delaware
Filed Jan. 4, 1965, Ser. No. 423,200
9 Claims. (Cl. 250—84.5)

ABSTRACT OF THE DISCLOSURE

The compact static atmosphere neutron generator for use in radioactivity well logging has a high voltage insulator arranged structurally in a specific manner relative to the source of high energy neutrons and is formed of a material having high mechanical strength characteristics, such as high density, isostatically formed, alumina. The insulator has a generally frustum conical outer surface and a tapering inner passage to minimize voltage stress concentrations and to provide leakage paths for arc discharges in order to avoid puncturing the material forming the insulator.

A sealed enclosure is divided into two compartments, the first compartment being under a substantial pressure and the second compartment being under a reduced pressure. The large end of the high voltage insulator is hermetically sealed adjacent the second compartment, and the small end of the insulator is positioned in the first compartment for supporting a hollow electrode at a point removed from the ion-permeable section thereof.

---

This invention relates in general to radioactivity well logging and in particular to a neutron generator which is used to produce a flux of high energy neutrons for use in radioactivity well logging. More particularly, it relates to a high voltage insulator component of a neutron generator.

In one form of radioactivity well logging, i.e., neutron logging, the characteristics of the subsurface formations are investigated by measuring the artificially induced radiation which results from either a continuous or pulsed bombardment of the subsurface formations with high energy neutrons. An example of this type of neutron logging is described in Arthur H. Youmans U.S. Patent No. 3,294,972 issued Dec. 27, 1966, entitled "Method and Apparatus for Identifying the Elements in the Formation Penetrated by a Drill Hole."

In order to produce high energy neutrons it is necessary to have an artificial source of neutrons. One way to produce high energy neutrons artificially is to utilize the deuterium-tritium reaction in a static atmosphere ion accelerator which results in 14 mev. neutrons. Fearon-Thayer U.S. Patent No. 3,071,690, dated Jan. 1, 1963 and entitled "Well Logging Radiation Sources" discloses such a source of high energy neutrons. A neutron generator utilizing this technique which is capable of being pulsed and is particularly adaptable for well logging purposes is disclosed in Arthur H. Youmans U.S. Patent No. 2,689,918, dated Sept. 21, 1954 entitled "Static Atmosphere Ion Acecelrator for Well Logging."

The requirements for components of a neutron generator used in well logging are very stringent. In the first instance, a logging tool is relatively small in diameter so that it will pass through the various small size openings generally used in oil well completion practices. Consequently, it has been found that the neutron generator for well logging has to be packaged in a pressure type housing having an inside diameter which may be as small as three inches. Also, logging tools and their components must be capable of operating in a hostile environment. A logging tool will go from ambient temperature to the temperature of the well, which may be as high as 150° C., in a relatively short period of time; therefore, the tool and its components are subject to rapid and extreme changes in temperature. In addition, the logging tool is subject to various types of impact and mechanical abuse in handling, as well as when it is being lowered into the well, especially when this is done at high speed. Also, during transportation and at other times it is subject to a considerable amount of vibration. All of these factors, as well as others, require that a neutron generator for use in a logging tool be mechanically rugged.

In addition to the structural requirements necessitated by the hostile environmental conditions of well logging operations, the electrical requirements of a neutron generator for use in well logging are also stringent. For example, high energy neutrons are produced in a static atmosphere by bombarding a tritium target with highly accelerated deuterium ions. To produce and accelerate the deuterium ions, a very high voltage is required. However, even though very high voltage is required, the input voltage and power available to the logging tool are relatively small due to the low power carrying capabilities of the logging cable; therefore, the necessary high voltage must be produced with a minimum of power. One method of generating the necessary high voltage is to use a belt driven type electrostatic generator such as is disclosed in A. J. Gale's Patent No. 2,960,610, dated Nov. 15, 1960, and entitled "Compact Neutron Source." This type of electrostatic generator, even within the confines of a well logging tool and having available only a small amount of power, is capable of generating a positive DC voltage of over 100 kv. at 20 microamperes current. This high voltage must be properly insulated within the confines of the neutron generator.

A static atmosphere type neutron generator is divided generally into two compartments. One compartment is filled with gas under relatively high pressure and contains the high voltage power supply such as the belt driven type electrostatic generator. The other compartment is filled with deuterium gas at a very low pressure and contains the ion source and target. An element of the system generally referred to as a high voltage insulator segregates the high pressure compartment from the low pressure compartment. Such segregation must be accomplished without the slightest leakage of gas therebetween. The high voltage insulator also provides electrical feed-through conductors whereby DC is transferred from the high voltage terminal of the electrostatic generator to an electrode assembly forming the ion source in the low pressure compartment. It is necessary to provide insulation between the high voltage terminal and ground so that the ion source can be maintained at the required high potential without the occurrence of sparks or other parasitic electrical discharge or leakage. Due to the limited lateral dimensions it is extremely difficult to provide such insulation. In addition to providing such electrical insulation, the insulator supports the ion source and maintains the correct geometric relationship of the ion source and its related electrode structures in the accelerating region under all operating conditions. Therefore, it is necessary that the insulator have extreme mechanical strength as well as electrical insulating capabilities.

As can be seen from the foregoing, both the structural and electrical requirements for the insulator are such that the high voltage insulator for a neutron generator must have exceedingly high capabilities.

To meet these extraordinary requirements, the novel high voltage insulator of the present invention is formed of a material having high mechanical strength characteristics as well as high dielectric strength. One such material that has been found satisfactory is high density, isostatically formed, alumina. The insulator has a generally frustum conical outer configuration and a tapering inner passage. Such shape minimizes voltage stress concentrations and provides leakage paths of such design that a discharge will tend to glide over the surface rather than tend to puncture the material forming the insulator. Such shape also results in optimizing the ratio of the respective diameters of the neck portion relative to the outer circumference so as to minimize the electric field at the surfaces exposed to the high voltage. Also the provision that the length is approximately equal to the diameter of the tank provides long leakage paths without unduly increasing the length of the logging instrument. In order to further reduce the probability of sparking, the insulator may be provided with a voltage divider element surrounding the neck portion of the insulator. This voltage divider subdivides the potential between the high voltage end of the insulator and the wall of the source tube.

It is an object of the present invention to provide an insulator for a neutron generator which has sufficient strength to maintain the ion source in correct geometric relation during all operating conditions and which will provide adequate electrical insulation and optimum voltage gradients to minimize sparking.

It is another object to provide a high voltage insulator for a neutron generator having high mechanical strength and which is so shaped that long leakage paths between the high voltage electrode and ground are established.

It is a further object to provide a high voltage insulator for a neutron generator formed of a material having high strength characteristics capable of hermetically isolating two regions of different pressures, as well as electrically insulating a high voltage electrode passing therethrough.

It is still a further object to provide a neutron generator having a high voltage insulator in which the effects of sparking between the high voltage electrode and ground are minimized.

Another object is to provide a high voltage insulator for a neutron generator which incorporates a voltage divider to suppress sparking and reduce the potential gradient at the thinnest section of the insulator.

Other objects and objects relating to details of manufacture, construction and use will be obvious to those skilled in the art from the detailed specification in which;

FIG. 1 is a cross section of a static atmosphere type neutron generator,

FIG. 2 is an enlarged cross section of the high voltage insulator portion of the neutron generator shown in FIG. 1.

Reference is now directed to the drawings, particularly to FIG. 1 where there is illustrated a static atmosphere type neutron generator 10 which is designed to produce high energy neutrons. It can be seen that the neutron generator 10 is enclosed in a housing 12 which has a generally cylindrical configuration and is of such a size as to be adaptable for well logging operations. When a neutron generator is used for well logging operations it is disposed within a pressure type housing (not shown) of the logging instrument; therefore, the inside diameter of the housing 12 may be as small as three inches so the neutron generator 10 may be incorporated in a logging instrument of such size that the logging instrument can be lowered down a borehole having a diameter as small as five inches, which is common size used in oil field completion practices. The logging instrument is lowered and raised in the borehole by means of a cable (not shown) one end of which is attached to the logging instrument and the other end is on a drum of a logging truck at the surface, all of which is well known in the art. The cable contains several conductors through which power is supplied from the surface to the logging instrument. Accordingly, all of the power which is available for the neutron generator must be transmitted to the neutron generator through one or more conductors in the cable. Due to the small size of the conductors of the cable and its length, and the fact that only a fraction of the total power is available for the neutron generator itself, the actual power available for the neutron generator may only be in the neighborhood of 40 watts.

The neutron generator 10 is divided into two general compartments. The first, which will be hereafter commonly referred to as the "generator compartment 14," contains a constant direct current high voltage supply and is filled with a gas under pressure in the range from 50 to 300 pounds per square inch. The second region, which will be hereinafter commonly referred to as the "source compartment 16," is filled with a suitable isotope or mixture of isotopes of hydrogen including deuterium at a pressure of approximately $10^{-2}$ mm. of Hg. The generator compartment 14 and the source compartment 16 are hermetically closed off from the surrounding atmosphere and also from each other.

The source compartment 16 constitutes the static atmosphere enclosure of the neutron generator 10 and is divided into two regions; an ion source region 18 and an ion accelerating region 20. The ion source region 18 is located centrally in the housing 12 and a target 22 is supported circumferentially about the ion source region 18 near the housing 12 so as to be spaced from the ion source region 18. The mutual isolation of the electrical fields in the ion source region 18 and the ion accelerating region 20 is accomplished by enclosing a central wire 23 of the ion source region 18 in a hollow electrode 24. In order to permit the passage of ions therethrough, a portion of the hollow electrode, opposite the target 22, has an ion permeable section 26. This section is made transparent by spacing a plurality of thin wires 28 in parallel spaced relation. The thin wires 28 are so spaced that ions generated in the ion source region 18 and accelerated can pass between the wires 28 and move toward the target 22. Inasmuch as the production of neutrons depends upon the number of ions striking the target, it is desirable that the ion permeable portion 26 be as transparent as possible to permit as many ions as possible to be accelerated toward the target. It has been found that the use of the parallel spaced thin wires 28 results in a very satisfactory ion permeable section 26.

Power is required in the ion source region 18 for the production of ions. A constant current source of positive DC high voltage provides the necessary power for the ion source region 18 and ion accelerating region 20. One means of supplying this constant current positive DC high voltage is by an electrostatic belt type generator 30 which is commonly known in the art as a Van de Graaff generator.

The principle of operation of an electrostatic belt type generator 30 is well known. Such generator 30 comprises essentially an insulating belt 32 which carries a charge from ground to the interior of the high voltage terminal 34, means for depositing an electric charge on the belt 32 at the ground and means for transferring the electric charge from the belt 32 to the high voltage terminal 34. The power is then conducted from the high voltage terminal 34 to the central wire 23 of the hollow electrode 24.

Mechanical energy used to drive the belt 32 is thus converted into potential energy of the accumulated electric charge on the high voltage terminal 34. This potential energy provides the power to produce the current of high energy ions. The power for running the belt is provided by a motor 36 which receives a portion of the power delivered to the logging instrument from the surface via the cable. This type of high voltage power supply is very efficient and a motor supplying only approximately 24 watts enables the generator 30 to deliver 20 microamps at 125 kv. or 2.5 watts.

The ion producing voltage for the ion source must be at substantially the same high potential as the high voltage terminal 34. The problem of insulating the conductor conveying the electric power from the voltage source to the ion source is a severe one. This is particularly true since the space available to obtain proper insulation is very small due to the limited diameter of the neutron generator 10. Also it is severe because of the operating conditions under which the neutron generator 10 must perform. The neutron generator 10 is not only subject to mechanical shock and vibration, but is also subject to rapid changes in temperature. One further requirement is that the insulator must support the differential pressure between the pressurized generator compartment and the practically evacuated source compartment. Accordingly, the requirements for a high voltage insulator 40 for the neutron generator 10 are very stringent.

As can be seen in FIG. 2, the high voltage insulator 40 has several functions. For instance, it supports the ion source assembly 18 in proper geometric relation with the target 22, i.e., concentric and coplanar. This geometric relation must be maintained under all operating conditions which, as has heretofore been pointed out, are quite severe. Also, the high voltage insulator 40 is the barrier between the high pressure in the generator compartment 14 and the evacuated source compartment 16, resulting in the insulator 40 supporting a force of approximately 1000 lbs. at ambient atmosphere temperature which may be increased by 50% or more during logging operations in hot wells. These structural functions of the insulator 40 require that it be made of material having good strength characteristics. It has been fund that nonporous, high density, isostatically formed alumina will meet such requirements, as well as providing the necessary electrical insulating characteristics when employed in accordance with the present invention.

The insulator 40 operates to provide electrical insulation for the supported hollow electrode 24 in both the generator compartment 14 which is under gas pressure and the source compartment 16 which is substantially evacuated. In effect, the high pressure gas in the generator compartment 14 assists in providing insulation between the hollow electrode 24 and the wall 42 of the generator compartment 14 which is at ground potential. Likewise, the vacuum in the source compartment 16 assists in providing insulation between the hollow electrode 24 and the wall 44 and other elements of the source compartment 16 which are also at or near ground potential. While it is almost axiomatic that a certain amount of sparking will occur in a high voltage machine during the process of conditioning it for operation, it is desirable that if sparks occur, they occur in the generator compartment 14 and preferably in the pressurized gas of such compartment because in certain instances the sparking may actually improve the subsequent operation of the compartment 14 and of course, the gas is self-healing. It is necessary that the solid material of the high voltage insulator 40 be capable of supporting the high voltage applied to it because if this material should break down, the operation of the neutron generator would cease. Also, sparking in the source compartment 16 is highly undesirable since this may cause evolution of some gases and vapors which are unwanted. There may also be permanent damage to surfaces resulting subsequently in high field emission which is undesirable since it will render the neutron generator 10 inoperable while it persists.

The high voltage insulator 40 has been so shaped as to minimize voltage stress concentrations. It is also so shaped as to provide long leakage paths in the event of sparking so that the sparks will glide over the surface rather than break through the solid insulation. Therefore, voltage gradients are established which reduce voltage stresses in the thin section of the insulator. To accomplish this, the high voltage insulator 40 has an outside configuration 46 in the shape of a frustum of a cone with the small end 48 adjacent to the high voltage terminal 34 in the generator compartment 14 and the large end 50 adjacent to the source compartment 16 and hermetically sealed therewith. The high voltage insulator 40 is also provided with tapering inner passage 52 which receives the hollow electrode 24. The tapering outer configuration 46 and the tapering passage 52 provide long leakage paths to minimize sparking between the hollow electrode 24 and ground. The small end 48 of the insulator 40 is provided with a cylindrical element 54, of Kovar or other suitable material, which forms a terminal. The terminal 54 has a passage 55 which receives and supports the end of the hollow electrode 24. The closed end of the hollow electrode 24 is sealed to the terminal 54 of the insulator 40 thereby forming one of the hermetic seals for the source compartment 16. The treminal 54 is also provided with a cylindrical skirt portion 56 which shrouds a short portion of the small end 48 of the insulator 40 thereby minimizing the probability of chipping of the end portion 48 due to sparks. The shroud 56 also covers the thinnest part of the insulator 40 and acts as in electrostatic shield for the thinnest portion of the insulator 40. The terminal 54 may be provided with a hollow cylindrical sleeve 58 which surrounds the input terminal to the source.

To further increase the electrical efficiency of the insulator 40, the ratio of the diameter of the generator compartment 16 relative to the diameter of the terminal 54 approximates the quantity $e$, the base of the natural logarithim, i.e., 2.7. Such a relation tends to minimize the electrical field at the surfaces exposed to high voltage. It has also been found that using approximately 2.7 as the ratio between the length of the insulator 40 and the diameter of the small end 48 of the insulator 40 results in an effective insulator having long leakage paths which tend to substantially suppress sparking without unnecessarily increasing the length of the logging instrument.

In order to further reduce the possibility of sparking and to increase the efficiency of the high voltage insulator 40, the small end 48 of the insulator 40 may be provided with a voltage divider 60 formed of a hollow cylindrical element, which surrounds the terminal 54 but is separated therefrom by an insulator 61. The voltage divider 60 has a corona point 62 on its inner wall. The corona point 62 will operate in series with corona point 64 on the wall 42 of the generator compartment 14. The corona points 62 and 64 being in series divide the potential between the hollow electrode 24 and ground into two stages. The stage between the terminal 54 and voltage divider 58 being of such voltage that the insulator 40 can support it through its thinnest section. It has been found that 1.5 is a suitable value for the ratio of the diameter of wall 42 of the generator compartment 14 to the outside diameter of the cylindrical element 60 of the voltage divider and for the ratio of the diameter of element 60 to the diameter of terminal 54. This arrangement divides the voltage into approximately 100 kv. in the outer annulus between the outer wall of the voltage divider 58 and the wall 42 of the housing 12, and 25 kv. in the inner annulus between the terminal 54 and the inner wall of the voltage divider 54, when corona points of appropriate length are employed. By reducing the length of corona point 62 relative to the length of corona point 64, the potential of electrode 60 can be varied, thereby permitting adjustment of the electric field. By thus optimizing the voltage distribution, the voltage can easily be supported by the thin section of the insulator 40 with an adequate margin of safety.

It has been found that by using insulator 40 of the present invention that the neutron generator 10 may be successfully used in commercial logging operations without electrical breakdown due to insulator failure.

I claim:

1. A compact static atmosphere neutron generator for producing a flux of high energy neutrons for use in radioactivity well logging comprised of
    a sealed enclosure divided into two compartments, the first compartment being under a substantial pressure and the second compartment being under a pressure of approximately $10^{-2}$ mm. Hg,
    a constant current source of positive DC high voltage located in the first compartment;
    a hollow electrode having an ion-permeable section in the second compartment, the ion permeable section being formed of a plurality of spaced parallel thin wires to provide adequate transparency for the emission of ions;
    a target spaced from the ion-permeable section of the hollow electrode;
    a high voltage insulator supporting the hollow electrode and maintaining it in geometrical relation with the target and insulating the electrode from the enclosure, the insulator being formed of high density, isostatically formed, alumina having an outer configuration in the shape of a frustum of a cone and being provided with a tapering inner passage receiving the hollow electrode, the large end being adjacent to the second compartment and hermetically sealed therewith, the small end of the insulator being positioned in the first compartment for supporting the hollow electrode at a point removed from the ion-permeable section, a metal sleeve surrounding the small end of the insulator and hermetically sealed therewith, the metal sleeve receiving and supporting the end of the hollow electrode thereby forming a terminal receiving the high voltage;
    a hollow cylindrical element surrounding the terminal of the insulator and extending over a portion of the small end of the insulator, a corona point on the inside wall of the cylindrical element forming the element into a voltage divider.

2. A compact static atmosphere neutron generator for producing a flux of high energy neutrons for use in radioactivity well logging comprised of
    a sealed enclosure divided into two compartments, the first compartment being under a substantial pressure and the second compartment being under a pressure of approximately $10^{-2}$ mm. Hg,
    a constant current source of positive DC high voltage located in the first compartment;
    a hollow electrode having an ion-permeable section in the second compartment, the ion-permeable section being formed of a plurality of spaced parallel thin wires to provide adequate transparency for the emission of ions;
    a target spaced from the ion-permeable section of the hollow electrode;
    a high voltage insulator supporting the hollow electrode and maintaining it in geometrical relation with the target and insulating the electrode from the enclosure, the insulator being formed of high density, isostatically formed, alumina having an outer configuration in the shape of a frustum of a cone and being provided with a tapering inner passage receiving the hollow electrode, the large end being adjacent to the second compartment and hermetically sealed therewith, the small end of the insulator being positioned in the first compartment for supporting the hollow electrode at a point removed from the ion-permeable section, a metal sleeve surrounding the small end of the insulator and hermetically sealed therewith, the metal sleeve receiving and supporting the end of the hollow electrode thereby forming a terminal receiving the high voltage.

3. A compact static atmosphere neutron generator for producing a flux of high energy neutrons for use in radioactivity well logging comprised of
    a sealed enclosure divided into two compartments, the first compartment being under a substantial pressure and the second compartment being under a pressure of approximately $10^{-2}$ mm. Hg,
    a constant current source of positive DC high voltage located in the first compartment;
    a hollow electrode having an ion-permeable section in the second compartment, the ion-permeable section being formed of a plurality of spaced parallel thin wires to provide adequate transparency for the emission of ions,
    a target spaced from the ion-permeable section of the hollow electrode;
    a high voltage insulator supporting the hollow electrode and maintaining it in geometrical relation with the target and insulating the electrode from the enclosure, the insulator being formed of high density, isostatically formed, alumina having an outer configuration in the shape of a frustum of a cone and being provided with a tapering inner passage receiving the hollow electrode, the small end of the insulator being positioned in the first compartment for supporting the hollow electrode at a point removed from the ion-permeable section and the large end being adjacent to the second compartment and hermetically sealed therewith, and a cylindrical element about the small end of the insulator having a corona point on the inside wall thereof thereby responding as a voltage divider.

4. A compact static atmosphere neutron generator for producing a flux of high energy neutrons for use in radioactivity well logging comprised of
    a sealed enclosure divided into two compartments, the first compartment being under a substantial pressure and the second compartment being under a pressure of approximately $10^{-2}$ mm. Hg,
    a constant current source of positive DC high voltage located in the first compartment;
    a hollow electrode having an ion-permeable section in the second compartment, the ion-permeable section being formed of a plurality of spaced parallel thin wires to provide adequate transparency for the emission of ions,
    a target spaced from the ion-permeable section of the hollow electrode;
    a high voltage insulator supporting the hollow electrode and maintaining it in geometrical relation with the target and insulating the electrode from the enclosure, the insulator being formed of high density, isostatically formed, alumina having an outer configuration in the shape of a frustum of a cone and being provided with a tapering inner passage receiving the hollow electrode, the small end of the insulator being positioned in the first compartment for supporting the hollow electrode at a point removed from the ion-permeable section and the large end being adjacent to the second compartment and hermetically sealed therewith.

5. A compact static atmosphere neutron generator for producing a flux of high energy neutrons for use in radioactivity well logging comprised of
    a sealed enclosure divided into two compartments, the first compartment being under a substantial pressure and the second compartment being under a pressure of approximately $10^{-2}$ mm. Hg, a constant current source of positive DC high voltage located in the first compartment;

a hollow electrode having an ion-permeable section in the second compartment;

a target spaced from the ion-permeable section of the hollow electrode;

the improvement consisting of a high voltage insulator supporting the hollow electrode maintaing it in geometrical relation with the target and insulating the electrode from the enclosure, the insulator being formed of high density, isostatically formed, alumina having an outer configuration in the shape of a frustum of a cone and being provided with a tapering inner passage receiving the hollow electrode, the ratio of the diameter of the enclosure of the diameter of the small end of the insulator and the ratio of the length of insulator to the diameter of the small end each approximately 2.7, the large end of the insulator being sealed to the second compartment and the small end of the insulator being positioned in the first compartment, a cylindrical element sealed to the small end, the cylindrical element having a passage mating with the tapering passage of the insulator, the passage in the cylindrical element receiving and supporting the hollow electrode at a point removed from the ion-permeable section, the end of the hollow electrode sealed to the end of the passage, a hollow cylindrical element surrounding the cylindrical member and small end of the insulator, the cylindrical element having a corona point on its inside wall to form the hollow cylindrical element into a voltage divider.

6. A compact static atmosphere neutron generator for producing a flux of high energy neutrons for use in radioactivity well logging comprised of a sealed enclosure divided into two compartments, the first compartment being under a substantial pressure and the second compartment being under a pressure of approximately $10^{-2}$ mm. Hg;

a constant current source of positive DC high voltage located in the first compartment;

a hollow electrode having an ion-permeable section in the second compartment;

a target spaced from the ion-permeable section of the hollow electrode;

the improvement consisting of a high voltage insulator supporting the hollow electrode to maintain it in geometrical relation with the target and insulating the electrode from the enclosure, the insulator being formed of high density, isostatically formed, alumina having an outer configuration in the shape of a frustum of a cone and being provided with a tapering inner passage receiving the hollow electrode, the small end of the insulator being positioned adjacent to the first compartment for supporting the hollow electrode at a point removed from the ion-permeable section, the ratio of the diameter of the enclosure to the diameter of the small end of the insulator and the ratio of the length of the insulator to the diameter of the small end each being approximately 2.7, the large end of the insulator being adjacent to the second compartment and hermetically sealed therewith, a hollow cylindrical member sealingly attached to the small end of the insulator, the cylindrical member having a passage receiving and supporting the hollow electrode, the hollow electrode sealed to end of said passage, the cylindrical member forming a terminal receiving the high voltage, the cylindrical member also having a cylindrical skirt which surrounds a short portion of the small end of the insulator to shroud such end.

7. A compact static atmosphere neutron generator for producing a flux of high energy neutrons for use in radioactivity well logging comprised of a sealed enclosure divided into two compartments, the first compartment being under a substantial pressure and the second compartment being under a pressure of approximately $10^{-2}$ mm. Hg;

a constant current source of positive DC high voltage located in the first compartment;

a hollow electrode having an ion-permeable section in the second compartment;

a target spaced from the ion-permeable section of the hollow electrode;

the improvement consisting of a high voltage insulator supporting the hollow electrode to maintain it in geometrical relation with the target and insulating the hollow electrode from the enclosure, the insulator being formed of high density, isostatically formed, alumina having an outer configuration in the shape of a frustum of a cone and being provided with a tapering inner passage receiving the hollow electrode, the small end of the insulator being positioned in the first compartment for supporting the hollow electrode at a point removed from the ion-permeable section, the ratio of the diameter of the enclosure to the diameter of the small end of the insulator and the ratio of the length of the insulator to the diameter of the small end each being approximately 2.7, the large end of the insulator being adjacent to the second compartment and hermetically sealed therewith.

8. A compact static atmosphere neutron generator for producing a flux of high energy neutrons for use in radioactivity well logging comprised of a sealed enclosure divided into two compartments, the first compartment being under a substantial pressure and the second compartment being under a pressure of about $10^{-2}$ mm. Hg;

a constant current source of high voltage located in the first compartment;

a hollow electrode having an ion-permeable section in the second compartment;

a target spaced from the ion-permeable section of the hollow electrode;

the improvement consisting of a high voltage insulator supporting the hollow electrode to maintain it in concentric relation with the target and insulating the hollow electrode from the enclosure, the insulator being formed of high density, isostatically formed, alumina with an outer configuration in the shape of a frustum of a cone and having a tapering inner passage receiving the hollow electrode, the small end of the insulator being positioned in the first compartment for supporting the hollow electrode at a point removed from the ion-permeable section and the large end being adjacent to the second compartment and hermetically sealing the second compartment from the first compartment, a metal sleeve about the small end of the insulator forming an electrostatic shield about such end.

9. A compact static atmosphere neutron generator for producing a flux of high energy neutrons for use in radioactivity well logging including a sealed enclosure divided into two compartments, the first compartment being under a substantial pressure and the second compartment being under a pressure of approximately $10^{-2}$ mm. Hg;

a constant current source of positive DC high voltage located in the first compartment;

an electrode having an ion-permeable section in the second compartment;

a target spaced from the ion-permeable section of the electrode;

the improvement comprising a high voltage insulator formed of material having high strength characteristics as well as high dielectric strength, the insulator having an outer configuration in the shape of a frustum of a cone, the base of the insulator being secured to one end of the second compartment, a central passage in the insulator tapering inwardly from the base, the central passage receiving the electrode, a terminal secured to the apex of the insulator, the terminal having a central passage aligned with the central passage of the insulator and receiving and supporting the end of the electrode, at a point removed from the ion-permeable section, the terminal having a skirt portion which surrounds a short distance along the apex end of the insulator and provides an electrostatic shield therefor, the base to the second compartment terminal to apex and electrode to passage of terminal connections all being such as to form seals for the second compartment.

References Cited

UNITED STATES PATENTS

| | | | |
|---|---|---|---|
| 2,191,071 | 2/1940 | Duttera | 174—28 |
| 2,625,581 | 1/1953 | Jenner et al. | 174—183 X |
| 2,907,884 | 10/1959 | Gale | 250—84.5 |

ARCHIE R. BORCHELT, *Primary Examiner.*